Feb. 21, 1928.
F. A. LAUBENTHAL
1,659,741
CONVERTIBLE VEHICLE BODY
Filed April 5, 1926     2 Sheets-Sheet 1
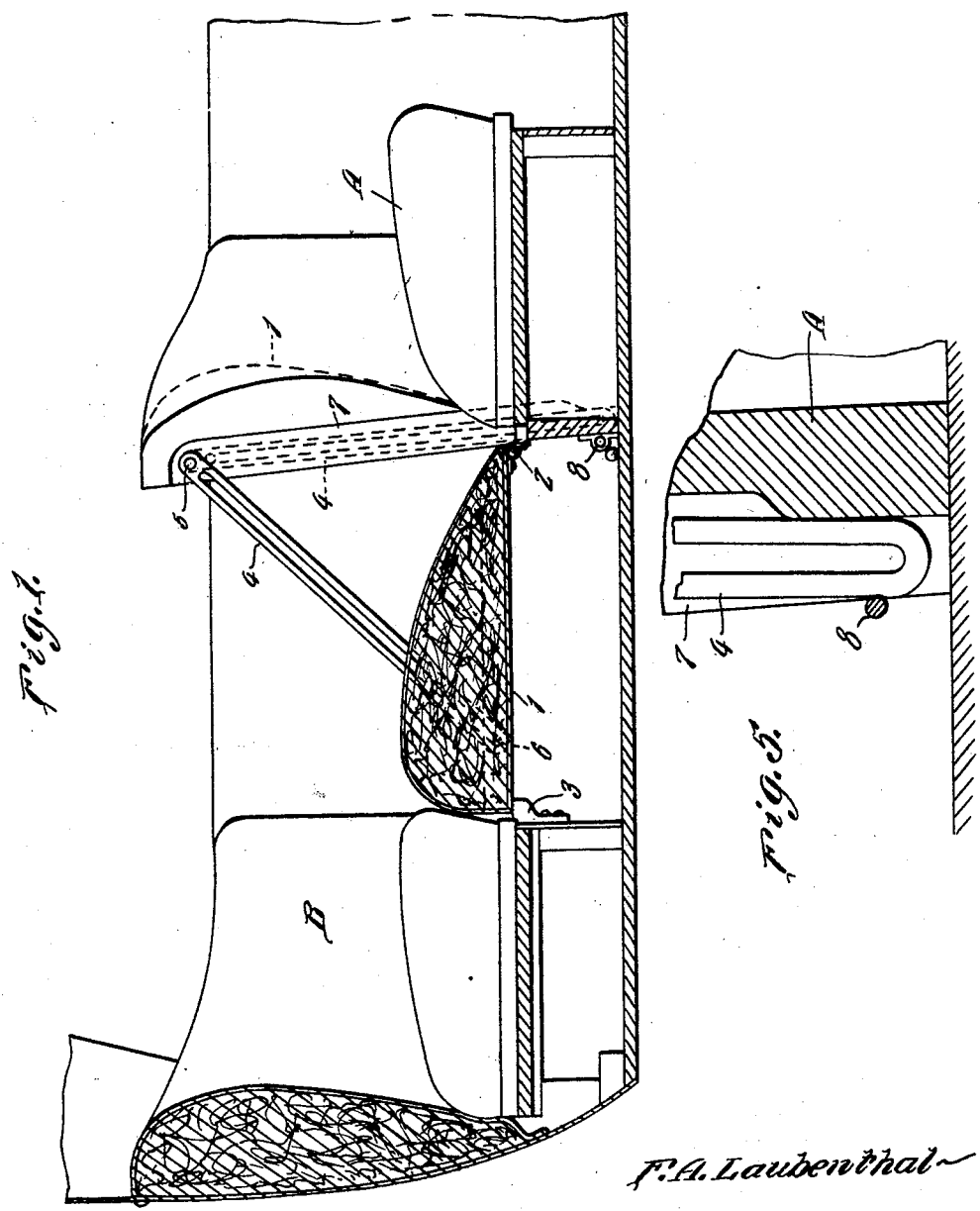

Feb. 21, 1928.
F. A. LAUBENTHAL
1,659,741
CONVERTIBLE VEHICLE BODY
Filed April 5, 1926
2 Sheets-Sheet 2
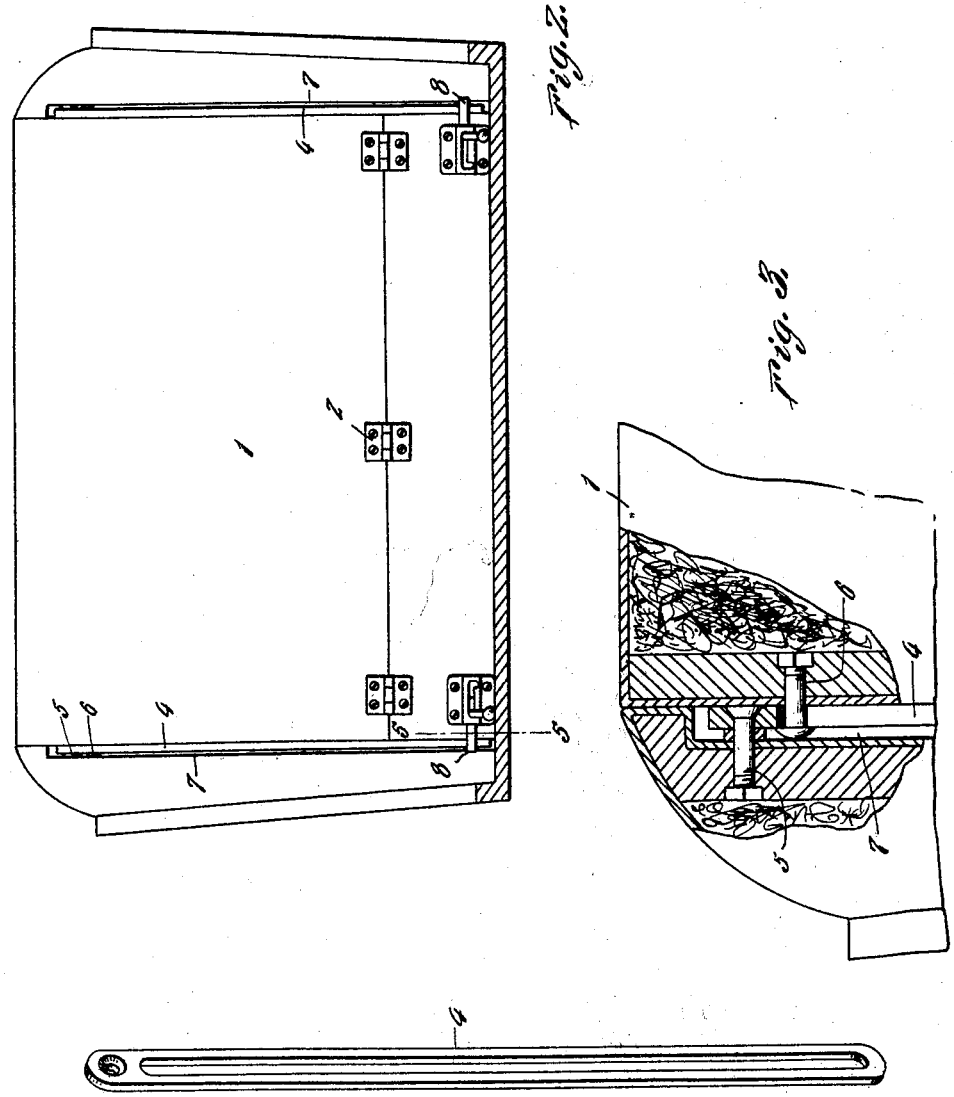
F.A.Laubenthal
INVENTOR
BY Victor J.Evans
ATTORNEY Patented Feb. 21, 1928.

1,659,741

UNITED STATES PATENT OFFICE.

FRANCIS A. LAUBENTHAL, OF DONNA, TEXAS.

CONVERTIBLE VEHICLE BODY.

Application filed April 5, 1926. Serial No. 99,877.

The invention relates to improvements in motor vehicles, the general object of the invention being to provide means for permitting the back of the front seat of the vehicle to be swung down to bridge the space between the two seats so as to provide a bed in which the occupants of the vehicle can sleep at the end of a day's run.

Another object of the invention is to provide simple means for holding the back in raised position.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a body of an automobile showing the invention in use.

Figure 2 is a transverse sectional view showing the back in raised position.

Figure 3 is a detail sectional view showing the bolts which engage one of the links.

Figure 4 is a view of one of the links.

Figure 5 is a section on line 5—5 of Figure 2.

As shown in these views, the back 1 of the front seat A is hinged to the bottom part of the seat by the hinges 2 so that it can be swung downwardly to rest upon a stop strip 3 at the front of the rear seat B so that the two cushions of the seat and the back 1 will form a bed. If desired the strip 3 may be omitted so that the back will be supported in horizontal position by the links. A pair of slotted links 4 is each pivoted at its upper end to a part of the frame of the body by the bolt 5 and bolts 6 at the sides of the back 1 engage the slots in these links. The sides of the body are each provided with a recess 7 for receiving a link when the back is in raised position and slide bolts 8 on the lower part of the stationary portion of the back will engage the links to hold the back in raised position.

When the automobile is to be used as a bed it is simply necessary to retract the bolts 8 so as to free the lower ends of the links 4 and then move the back 1 downwardly until it rests upon the strip 3 or it is supported by the links if the strip is not used. The links 4 will move to the inclined position shown in Figure 1 during this action. The bed clothing or blankets or the like can then be placed on the two seats and the back to form a bed. When it is desired to use the seats again it is simply necessary to throw the back 1 upwardly to its original position which will cause the links to move into the recesses 7 and then the bolts 8 are shot to engage the lower ends of the links to hold them in the recesses and thus the back will be held in raised position.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a motor vehicle, a front seat having a hinged back, the portions of the sides of the body engaged by the side edges of the back, when the same is raised, having recesses therein, a slotted link pivoted at its upper end in the top of each recess, bolts on the seat back at the ends thereof engaging the slots in the links and causing the links to swing outwardly when the seat is lowered, the bolts engaging the lower end walls of the slots when the seat is in fully lowered position and locking bolts on the rear lower part of the front seat for engaging the free ends of the links, when the back of the seat is raised, to hold the links in the recesses with the back of the seat in raised position.

In testimony whereof I affix my signature.

FRANCIS A. LAUBENTHAL.